(12) United States Patent
Paul et al.

(10) Patent No.: US 11,269,677 B2
(45) Date of Patent: Mar. 8, 2022

(54) SYSTEM AND METHOD TO ANALYZE AND OPTIMIZE APPLICATION LEVEL RESOURCE AND ENERGY CONSUMPTION BY DATA CENTER SERVERS

(71) Applicant: Vigyanlabs Innovations Private Limited, Mysore (IN)

(72) Inventors: Mousumi Paul, Howrah (IN); Sanjaya Ganesh, Bangalore (IN); Srivatsa Krishnaswamy, Bangalore (IN); Srinivas Varadarajan, Mysore (IN)

(73) Assignee: Vigyanlabs Innovations Private Limited, Mysore (IN)

( * ) Notice: Subject to any disclaimer, the term of this patent is extended or adjusted under 35 U.S.C. 154(b) by 313 days.

(21) Appl. No.: 16/583,242

(22) Filed: Sep. 25, 2019

(65) Prior Publication Data
US 2021/0042140 A1 Feb. 11, 2021

(30) Foreign Application Priority Data
Aug. 8, 2019 (IN) .............................. 201941032245

(51) Int. Cl.
*G06F 9/455* (2018.01)
*G06F 1/3287* (2019.01)
(Continued)

(52) U.S. Cl.
CPC ........ *G06F 9/45558* (2013.01); *G06F 1/3206* (2013.01); *G06F 1/3287* (2013.01);
(Continued)

(58) Field of Classification Search
None
See application file for complete search history.

(56) References Cited

U.S. PATENT DOCUMENTS

| 7,386,743 B2 | 6/2008 | Bahali et al. |
| 8,201,007 B2 | 6/2012 | Varadarajan |

(Continued)

FOREIGN PATENT DOCUMENTS

CN 103559084 A 2/2014

OTHER PUBLICATIONS

Gelenbe, E., et al., "The Impact of Information Technology on Energy Consumption and Carbon Emissions," Ubiquity, an ACM publication, Association for Computing Machinery, Jun. 2015, Article No. 1, pp. 1-15.

(Continued)

*Primary Examiner* — Kenneth Tang
(74) *Attorney, Agent, or Firm* — Rahman LLC (57) ABSTRACT

Data Center (DC) server power management monitors resource utilization and energy consumption characteristics of an individual host server, and a Virtual Machine (VM) and the applications running inside any VM of DC servers. An analysis and learning module identifies trends and opportunities to optimize DC resources by releasing the underutilized host servers. It derives power metrics to measure the energy footprint of the VMs and the associated applications. It suggests optimal destination servers to migrate each of the VMs with corresponding applications from the underutilized host servers. The power consumption of these VMs with their applications on the power-efficient destination servers is less after the migration. Powering off the underutilized freed-up servers saves energy impacting the overall power consumption of the data center. The learning modules predict the opportunities for power capping on any VM or physical host server to reduce the data center's energy consumption without impacting performance.

20 Claims, 7 Drawing Sheets

(51) Int. Cl.
*G06F 1/3206* (2019.01)
*G06F 9/48* (2006.01)

(52) U.S. Cl.
CPC .... *G06F 9/4881* (2013.01); *G06F 2009/4557* (2013.01); *G06F 2009/45575* (2013.01); *G06F 2009/45591* (2013.01)

(56) References Cited

U.S. PATENT DOCUMENTS

| | | | |
|---|---|---|---|
| 8,549,333 | B2 | 10/2013 | Jackson |
| 9,477,281 | B2 | 10/2016 | Varadarajan et al. |
| 10,146,288 | B2 | 12/2018 | Varadarajan et al. |
| 2010/0070784 | A1 | 3/2010 | Gupta et al. |
| 2011/0078467 | A1 | 3/2011 | Hildebrand |
| 2011/0213997 | A1* | 9/2011 | Kansal .................. G06F 1/3206 713/324 |
| 2013/0191658 | A1 | 7/2013 | Malik et al. |
| 2013/0198468 | A1 | 8/2013 | Antony et al. |
| 2013/0268741 | A1 | 10/2013 | Daly et al. |
| 2014/0351613 | A1* | 11/2014 | Kansal .................. G06F 1/3234 713/320 |
| 2019/0213027 | A1* | 7/2019 | Bhandari .............. G06F 9/5077 |
| 2019/0243685 | A1* | 8/2019 | Guim Bernat ........ G06F 9/4856 |
| 2019/0317814 | A1* | 10/2019 | Jin ........................ G06F 9/5027 |
| 2020/0145299 | A1* | 5/2020 | Do .......................... H04L 67/10 |
| 2021/0028991 | A1* | 1/2021 | Nataraj ................. H04L 41/145 |

OTHER PUBLICATIONS

Manotas, I., et al., "An Empirical Study of Practitioners' Perspectives on Green Software Engineering," 2016 IEEE/ACM Proceedings of the 38th IEEE International Conference on Software Engineering, May 14-22, 2016, Austin, Texas, pp. 237-248.

Khoshkholghi, M., et al., "Energy-Efficient Algorithms for Dynamic Virtual Machine Consolidation in Cloud Data Centers," IEEE Access, vol. 5, Jun. 1, 2017, p. 10709-10722.

Dolbeau, R., "Theoretical Peak FLOPS per instruction set on modern Intel CPUs," Working Paper, Research Gate, Jan. 2015, pp. 1-10.

Ullah, A., et al., "Action Recognition in Video Sequences using Deep Bi-Directional LSTM With CNN Features," IEEE Access, vol. 6, Nov. 28, 2017, pp. 1155-1166.

* cited by examiner

SYSTEM AND METHOD TO ANALYZE AND OPTIMIZE APPLICATION LEVEL RESOURCE AND ENERGY CONSUMPTION BY DATA CENTER SERVERS

CROSS-REFERENCE TO RELATED APPLICATION(S)

This application claims the benefit of Indian Patent Application No. 201941032245, filed on Aug. 8, 2019, the complete disclosure of which, in its entirety, is herein incorporated by reference.

BACKGROUND

Technical Field

The embodiments herein generally relate to measuring application level resource utilization and power consumption within virtual machines (VMs), and more particularly to optimization of data center resources by identifying underutilized host servers and finding optimum server platforms to run their VMs with their applications to reduce overall power consumption.

Description of the Related Art

Within this application several publications are referenced by Arabic numerals within brackets. Full citations for these publications may be found at the end of the specification immediately preceding the claims. The complete disclosures of all these publications as well as the heretofore referenced patents and patent publications in their entireties are hereby expressly incorporated by reference into the present application.

In the past few years, research on the analysis and improvement of energy consumption for data center servers has been increasing. The current solutions to data center power management typically use the following approaches:

The recent advancement related to reducing server power management include U.S. Patent Application Publication Nos. 2010/0070784, 20130268741, and U.S. Pat. No. 7,386,743 [1, 2, 3]. The '784 patent publication recommends powering-off a host system whose utilization is below the target utilization. The '741 patent publication describes a method to turn-on and turn-off memory chips outside of a host processor device via a memory controller based on the host memory access level. The '743 patent comprises a system management processor coupled to the power management communication port which comprises power-managed logic configured to transmit power management data to the power management server data processing system and to receive a power management command utilizing the power management communication port. Moreover, the power management command is generated utilizing the power management data, and the power management data comprises power management capability data.

Some other advancements in cloud computing infrastructure and server cluster management [3] provide an opportunity to efficiently utilize server resources by migration of virtual machines across different servers as further described in Chinese Patent No. CN103559084A, U.S. Pat. No. 8,549,333, and U.S. Patent Application Publication Nos. 2011/0078467 and 2013/0198468. This server cluster management monitors and analyzes the resource utilization of individual servers and virtual machines (VMs) residing on them. The techniques in the '467 patent publication and the '333 patent monitors the resource utilization over a server cluster and applies some intelligent policies to perform load balancing and perform some power actions among the servers to reduce the overall power consumption. The '468 patent publication migrates a VM between logical storage units to free up physical storage units and achieve better storage hardware resource utilization and reduced power consumption by powering down freed-up physical storage units.

Generally, all such research related to optimize data center power consumption concentrates on the resource utilization behavior of VMs and the host servers. However enough care has not been taken over the behavior of applications running inside the VMs.

The prominent evolution of mobile computing platforms and its hyper-personalized items like smartphones, tablets, smart watches etc., have changed the way people use and interact with software/apps. However, the common yet challenging requirement of mobile computing platforms is they are battery-driven. As users interact more with these software/apps, they tend to be less available, since even small, well-optimized operations consume some amount of energy. The current research works indicate that power consumption modeling and energy-aware software are becoming important and gaining much interest.

This concern, however, pertains not only to mobile platforms. Indeed, large entities in the software industry are also reaching the same conclusion, as stated in one of the very few energy-efficient software development guides: "Even small inefficiencies in apps add up across the system, significantly affecting battery life, performance, responsiveness, and temperature." Corporations that maintain datacenters struggle with soaring energy costs. These costs can be attributed in part to overprovisioning with servers constantly operating below their maximum advisable capacity (for example, U.S. data centers are wasting huge amount of energy [1]), and the developers of the apps running on these datacenters generally do not take energy into consideration [2].

In the real world, businesses request servers to run their applications. The cloud computing infrastructure provides them virtual machines and charges them according to the infrastructure and resources that they have provided. The cloud service providers have no incentive to either encourage writing energy efficient applications or to release the server after use. Therefore, to measure and improve efficiency for entire systems, energy-efficiency indicators are needed at the level of services.

Monitoring the resource and energy utilization behavior of applications, running inside virtual machines provides a basis to cross charge internal businesses not only based on infrastructure and resources but also based on the energy consumed by the applications. So, businesses can be more accountable by writing energy efficient applications thus reducing energy footprint. Also, resources can be released back to pools when they are not in use.

The power measurement of virtual machines creates a basis to analyze the proper utilization and requirement of energy distribution across the physical server. In addition, the application level power consumption generates a scope when the virtual machine can be transferred into low power mode or suspended. Unfortunately, during the last decade, little attention has been placed on creating techniques, tools, and processes to empower software developers to better understand and use energy resources. Therefore, application level power consumption depicts the whole picture when it comes to energy consumption and performances. Business will be more aware about their costs if they don't write energy efficient applications. Data center resources can be highly optimized if they assign optimum virtual platform to run applications; not only on performance metrics but also on the energy footprint.

SUMMARY

In view of the foregoing, a need exists for intelligent monitoring systems and methods for data center server and virtual environments that builds an understanding of the various components of a data center infrastructure and how the components interact to provide improved performance analysis to users. For instance, a need exists for a system and method to analyze and optimize the utilization of data center resources. In addition, a system and method are also required to optimize data center server power consumption which is now a highest technology and environment concern.

Accordingly, in one embodiment, a method of monitoring resource utilization of applications running inside virtual machines and host servers is provided. In another embodiment, inventive systems and methods are provided for assessing the performance of a business application residing in a virtual machine of host server in the context of the overall performance of the host server and the virtual environment in which the application is running. The assessment is performed based on the resource needs by the applications, and is measured in standard metrics. It helps to verify that if the resource needs of the business application are satisfied by the current virtual machine architecture and also by the current host server architecture. Thus, in certain circumstances, monitoring systems are able to determine if a performance issue detected in the virtual machine is actually the result of a bottleneck on the underlying physical platform (e.g., the host server). It can further determine the performance of and/or priority assigned to, other related objects in the virtual environment, such as other virtual machines running on the same host server, to identify potential causes of problems.

The monitoring activity also includes getting health status and power consumption of host servers. In another embodiment of the system, a learning is established to derive power metrics that estimate power consumption of virtual machines and the applications running inside, and generating a power consumption heatmap for virtual machines as well as for applications/processes running inside them. The heatmap provides a clear image of power distribution among virtual machines and also identifies the applications/processes that consumes more or less power, wherein the power consumption heatmap helps data center administrator to distribute the power among different host servers. Therefore, a system and method have been established to link business services not only based on the resource utilized but also based on energy footprint of the applications. The power metrics are used to find the power efficiency of heterogenous host servers. That depicts a transparent view of power consumption trends of any virtual machines or their applications into different heterogenous host server platforms. It helps data center administrator to find optimal host server to run any applications or virtual machines with specific resource demand.

In yet another embodiment, a system and method have been implemented to detect the underutilized servers and generates an advisory report to release these servers after migrating all of its virtual machines to another host server that meets their resource demand. The embodiments herein can utilize previous performance information from separate virtual environments to project a performance impact resulting from the migration of a given virtual machine from one host server to another. Therefore, the host servers that meets the resource demands of these virtual machines, have been considered as the destination servers list. Then, the embodiments herein use power metrics to find an optimal host for migrating a virtual machine whose power efficiency is greater than the other.

In another embodiment, a system and method have been implemented to detect the performance bottleneck of the business applications, running inside the virtual machines. Based on the monitored performance data of the applications, the embodiments herein diagnose that the resource demand of those applications that have not been satisfied; i.e., the applications are underperforming. Then, it identifies probable causes for the underperformance and provides a remedy for this. Most of the time the causes are related to overloading in the current host servers at which point the method suggests migrating the applications to another available host server. Therefore, it can eliminate performance bottlenecks of the business application by automatically balancing workloads across hosts. The embodiments herein provide a suggestive action to migrate virtual machines from the current host platform to a new host in order to optimize performance and overall power consumption. The embodiments herein also satisfy the platform dependencies of applications or software running inside virtual machines or in a host server.

In another embodiment a method of optimizing data center server power consumption has been provided. Some embodiments contain a predictive module that performs analytics on performance data of a host server, virtual machines, and the top applications in terms of resource usage running inside virtual machines. The predictive modules forecast the utilization of virtual machines and host server and recommends power capping actions. For example, some virtual machines may run some web applications, which are basically time dependent applications. The predictive module performs analysis of the utilization of these applications running inside virtual machines and forecasts the idleness of the virtual machines. In another embodiment, a method is provided of measuring virtual machine power consumption. Based on the log of such power consumption of virtual machine system triggers power capping action to reduce server overall power consumption.

Other embodiments can leverage intelligent state propagation and set ample alerts of impending trouble, such as resource shortages or hardware issues, and quickly identify the source of current problems. The resource alerts immediately notify when performance parameters for hosts, virtual machines, or clusters go above or fall below predefined warning or error thresholds. Event alerts immediately notify of native host server issues pertaining to failover clustering, integration, migration failures or virtual machine configuration module errors.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION

The embodiments described herein and its various features and the advantageous details thereof, are explained more fully with reference to the non-limiting embodiments that are illustrated in the accompanying drawings and detailed in the following description. Descriptions of well-known components and processing techniques are omitted to not unnecessarily obscure what is being disclosed. Examples may be provided and when so provided are intended merely to facilitate an understanding of the ways in which the embodiments herein may be practiced and to further enable those of skill in the art to practice its various embodiments. Accordingly, examples should not be construed as limiting the scope of what is disclosed and otherwise claimed. In the drawings, the size and relative sizes of layers and regions may be exaggerated for clarity.

Certain embodiments of the systems and methods provide a monitoring Solution that understands the relationships and interactions between components in a datacenter host server and virtual infrastructure and application/processes running inside virtual machine (VM), helps administrators detect, diagnose and resolve incidents and problems, ensures performance, and/or performs capacity planning and chargeback. For example, certain embodiments herein allow an administrator or other user to visualize an entire virtual infrastructure through detailed architectural representations and to use alerts and expert advice to diagnose the cause(s) of problems affecting performance. Embodiments herein can also provide reports for capacity, performance, asset tracking, provisioning trends and/or infrastructure events to communicate current and available capacity to appropriate personnel and to identify growth due to provisioning.

In some embodiments, systems and methods introduce a new level of intelligence in applications/process level monitoring. For instance, rather than simply reporting statistics, the embodiments herein are adapted to understand the role of each process/application in the virtual environment and analyze their performance data according to advanced rules and logic specific to that role. Moreover, rather than rely on rigid threshold alerting, embodiments herein provide a variety of alarms that identify problem trends and/or predict potential bottlenecks. Such a level of predictive analysis allows administrators to take preventative action and resolve performance and configuration issues before the workload of the virtual environment is significantly affected. For example, the performance of applications inside a virtual machine may suffer due to consistent process drops or network packets drops. The constant monitoring of those applications can easily produce such analysis so that administrators can take some preventive actions.

Yet another embodiment provides a method to derive power metrics to estimate individual power consumption of virtual machine and their applications based on the resources' utilization. The application level and virtual machine level energy footprint in a heatmap clearly shows which application/virtual machine is consuming the maximum energy of the host server. An application/process level energy heatmap is derived which helps administrator on the power distribution over the host servers.

Yet another embodiment of the system relates the health status of the host server performance with different applications/processes running inside virtual machines of that host server. If the temperature of a physical host server reaches above a critical threshold then application/process level power consumption can play a key role to identify which applications and/or processes in which it happened. Similarly, if any memory failure occurred then from applications and or processes level resource utilization helps in detecting which applications and or processes are responsible for that. Based on this analysis, administrators can identify and provision optimal and safe platform to run specific software.

In certain embodiments, the system predicts the idleness of the virtual machine and host servers in terms of low resource utilization. Generally, some virtual machines are dedicated to run some sort of applications or processes. It is found that all applications do not run all the time. Therefore, process level resource monitoring helps in predicting the time spans when these virtual machines are idle because these applications are not running and at those times VM's resource consumption is very low. Therefore, based on the idleness prediction of the virtual machine, the system can trigger some power reducing action to minimize overall power consumption.

In another embodiment, a system and method are capable of relating applications/processes on one virtual environment to another virtual environment so as to determine the effect in performance change. This is one of the important parameters to utilize data center server resources optimally. Moreover, such information can be used in load balancing the resources of physical machines in a virtual infrastructure.

The features of the systems and methods will now be described with reference to the drawings summarized above. Throughout the drawings, reference numbers are re-used to indicate correspondence between referenced elements. The drawings, associated descriptions, and specific implementation are provided to illustrate embodiments herein and not to limit the scope of the disclosure.

In addition, the methods and functions described herein are not limited to any particular sequence, and the blocks or states relating thereto can be performed in other sequences that are appropriate. For example, described blocks or states may be performed in an order other than that specifically disclosed, or multiple blocks or states may be combined in a single block or state.

Figure 1:
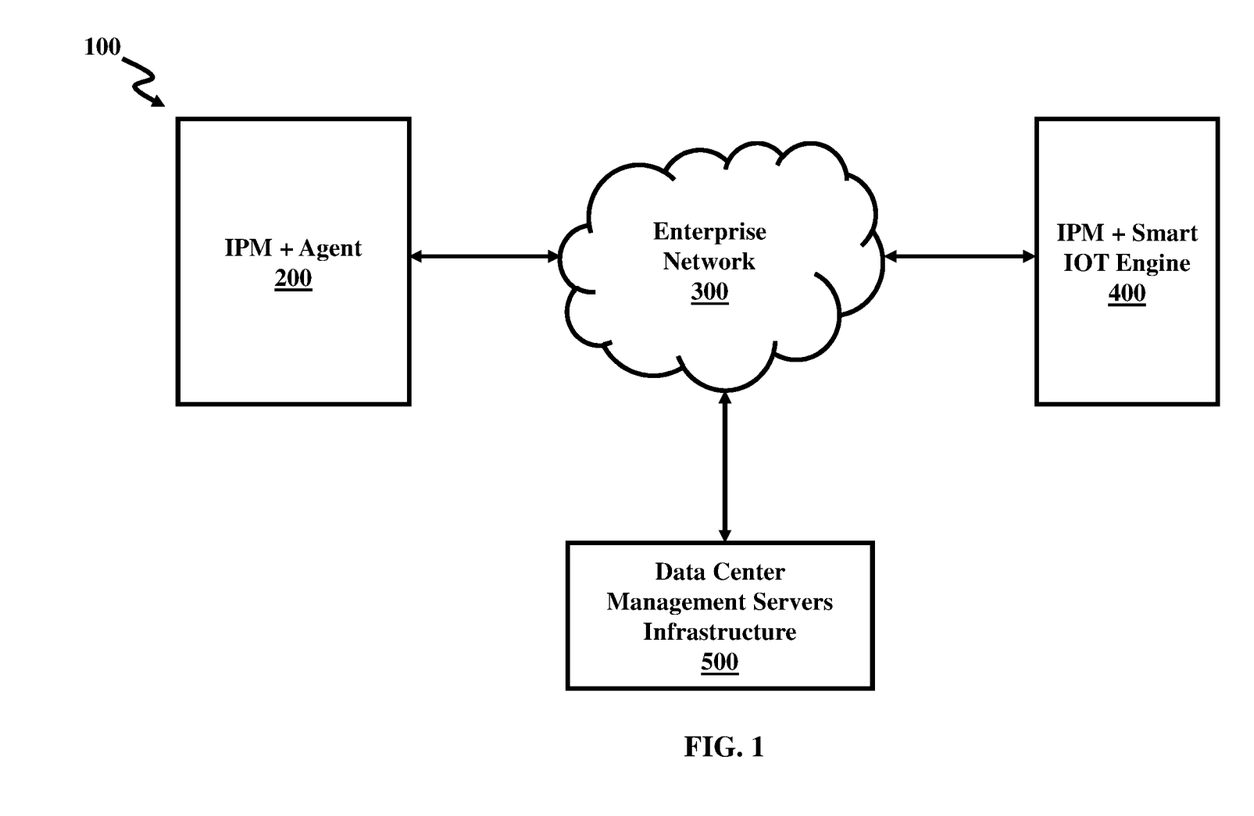
FIG. 1 illustrates an exemplary block diagram of a system that can implement optimum power consumption of the data center servers, according to an embodiment herein.

FIG. 1 illustrates the overall architecture of the IPM+IOT system 100 that can optimize data center resource utilization and power consumption, according to certain embodiments herein. In some embodiments, the IPM+IOT system 100 is configured to understand the relationships and interactions between components in the physical host server and virtual infrastructure and to help administrators detect, diagnose and/or resolve incidents and problems relating to the performance of one or more components in the context of the entire virtualized system. In addition, it reduces data center overall server power consumption by analysis and prediction of parameters related to power consumption of host servers and virtual machines and executes power capping actions.

The system 100 includes an IPM+agent 200, connected with IPM+IOT engine 400 with an enterprise networking medium 300. The network media 300 may include a LAN, WAN (internet) etc. The IPM+agent 200 establishes a remote session with data center host servers and virtual machines with the help of enterprise network 300. Yet another embodiment of system 100 is data center server management infrastructure 600.

Figure 2:
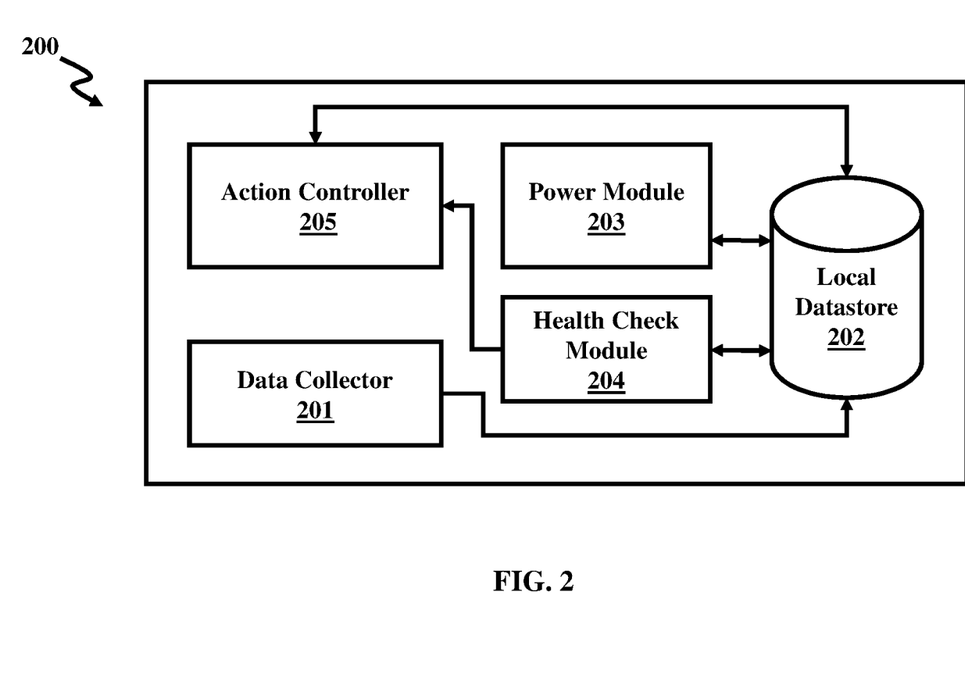
FIG. 2 illustrates a block diagram of an exemplary intelligent power management (IPM)+agent for monitoring system of FIG. 1, according to an embodiment herein.

FIG. 2 illustrates a block diagram of a client-side IPM+ agent 200, according to certain embodiments herein. The agent 200 further comprises a data collector module 201, a local datastore 202, a power module 203, a health check module 204, and an action controller 205. The data collector module 201 establishes a remote session with host server 604 and virtual machines 605 and collects the performance data, health status data, and power consumption data of host server, and their internal components details. It also monitors top applications running inside virtual machines and their resource consumption data. Such a method of monitoring and data collection over a period of time is useful in order to learn the utilization pattern of data center servers and virtual machines. Proper understanding of utilization patterns helps in making predictions of when power will be least consumed in virtual machines or in host servers. These predictions create a scope to execute power reduction actions such as reducing the processor clock speeds, turning off processors/cores or storage devices, etc. The data collector module 201 stores all this information in the local datastore 202.

Next, the agent 200 generates a power module 203 that receives host server power consumption as input from local datastore 202 and derive power consumption for virtual machines and the power consumption of applications running inside virtual machines. The derived power consumption of virtual machines and applications/processes are also stored into local datastore 202. This power model is used to measure the power used by a virtual machine as well as by applications or processes running inside virtual machine. Conceptually, the power used by the virtual machine is measured by tracking the hardware resources (such as the CPU, disk, memory, network, etc) used by the virtual machine. The output of the power model 203 is the optimal power model coefficients.

The overall power consumption of a physical host server can be modeled as a summation of power consumed by static components and power consumed by dynamic resources:

$$P_{Host} = P_{static} + P_{dynamic}$$

$P_{static}$ is generally constant. It is the power consumed by static hardware components of a server. $P_{Host}$ is proportional to the dynamic power consumed by hardware that depends on resource utilization $P_{dynamic}$. The Host dynamic power $P_{dynamic}$ can be modeled as a summation of power consumed by four hardware resources CPU, memory, disk, and network:

$$P_{dynamic} = P_{CPU} + P_{disk} + P_{mem} + P_{net}$$

The CPU power $P_{CPU}$ is proportional to CPU usage. Similarly, power consumed by the disk, memory, and network $P_{disk}$, $P_{mem}$, $P_{net}$ are proportional to disk read/write, memory access, and network receive/transmit. Hence, server dynamic power consumption can be considered as:

$$P_{dynamic} = k_1(\text{cpu usage}) + k_2(\text{disk usage}) + k_3(\text{memory usage}) + k_4(\text{network usage})$$

Here, $k_1$, $k_2$, $k_3$, $k_4$ are constants.

CPU usage has been represented in terms of GFLOPS (Giga Floating Point Operations per second) using the following conversion method.

To compute the CPU usage in terms of GFLOPS, The Peak Theoretical Performance [3] has been considered. Therefore, each server's highest computing capacity can be measured in terms of GFLOPS using the following equation:

Server performance in GFLOPS=(CPU speed in GHz)×(no. of CPU cores)×(CPU instruction per cycle)×(no. of CPU per node)  (1)

Therefore, a server's peak theoretical performance can be considered as 100% CPU usage of the host server. The power model calculates the Peak Theoretical FLOPS for each server and store it to the local store 202 for future use. Hence, at some instant if a server's CPU usage is 60% then it indicates it is using 60% of its highest capacity. The data collector module 201 collects server CPU usage in % and it is converted into GFLOPS using the following equation:

CPU usage in CFLOPS=CPU %×(server peak theoretical GFLOPS)  (2)

On the other hand, disk usage is a sum of desk read and write in bytes. Similarly, network usage is a sum of number of bytes received and transmits and memory usage is represented as amount of memory consumed in bytes:

disk usage=disk read in bytes+disk write in bytes  (3)

network usage=packets received in bytes+packets transmit in bytes  (4)

memory usage=memory consumed in bytes  (5)

The data collector module 201 collects the CPU, disk, memory and network usage of virtual machines and applications/processes running inside of it, on a defined interval basis and stores in local datastore 202.

The power module 203 uses the host power consumption data with its resources consumed at different instant of time. The power module 203 performs regression over this data and finds out the coefficients $k_1$, $k_2$, $k_3$, $k_4$ and intercept as $k_0$. $k_0$ is considered as the static power of the host server and $k_1$, $k_2$, $k_3$, $k_4$ are the coefficients of CPU, memory, disk, and network usage. The power module 203 saves these all of these coefficients for each host server to the local datastore 202. The power consumption of virtual machines and their applications/process fall in server dynamic power consumption because it runs on the same infrastructure and $P_{static}$ acts as a constant ($k_0$).

Therefore, to derive power consumption of virtual machines and applications/processes, one can use these coefficients with their corresponding hardware resource consumption:

$$P_{VM}=k_1(\text{CPU}_{VM})+k_2(\text{disk}_{VM})+k_1(\text{memory}_{VM})+k_1(\text{network}_{VM}) \qquad (6)$$

$$P_{app}=k_1(\text{CPU}_{app})+k_2(\text{disk}_{app})+k_1(\text{memory}_{app})+k_1(\text{network}_{app}) \qquad (7)$$

Here, $P_{VM}$ and $P_{app}$ are the power consumption of virtual machine and application/process at any instant of time, respectively.

Figure 4:
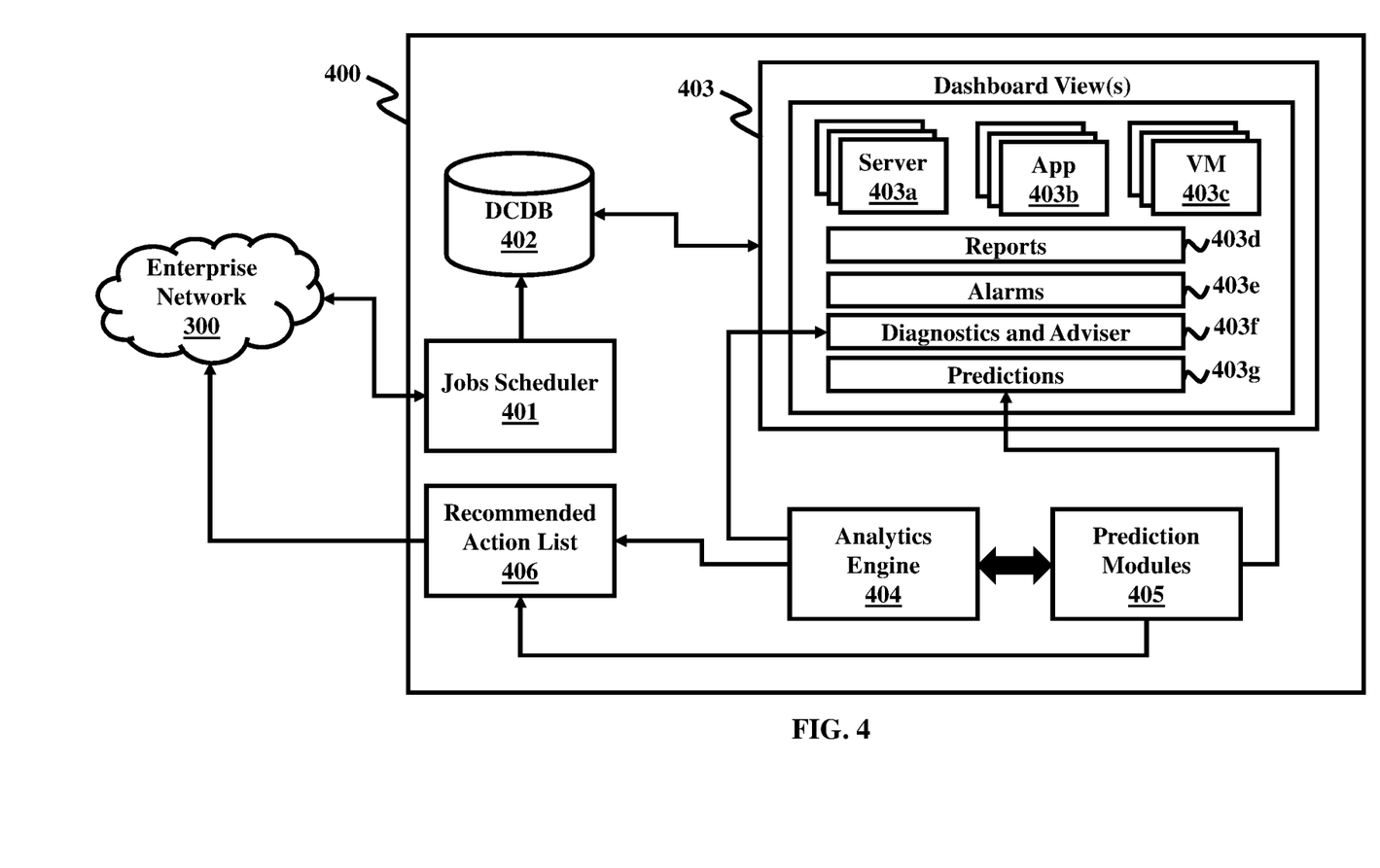
FIG. 4 illustrates a block diagram of an exemplary intelligent power management and internet of things (IPM+IOT) engine for providing multiple views and generating control instructions that can be implemented to optimize usage of data center resources, according to an embodiment herein.

The system 200 further comprises a health status module 204. The data collector module 201 also collects the server's health status data. Module 204 contains some constraints sets and action sets. It takes the health status data from local datastore 202 and verifies with these constrains sets. If at some instant if any of the constraints have been violated, then it recommends a specific action for that constraint violation to the action controller module 205. Suppose the server temperature is beyond the critical threshold, then it recommends some cooling actions to the action controller 205. Action controller 205 performs the specific actions recommended by health status module 204. The action controller 205 also receives some recommended actions from local data store 202 and performs those actions on the recommended data center component. This action set also comprise of some predicted power actions recommended by analytics engine 406 of IPM+IOT engine 400.

Figure 3:
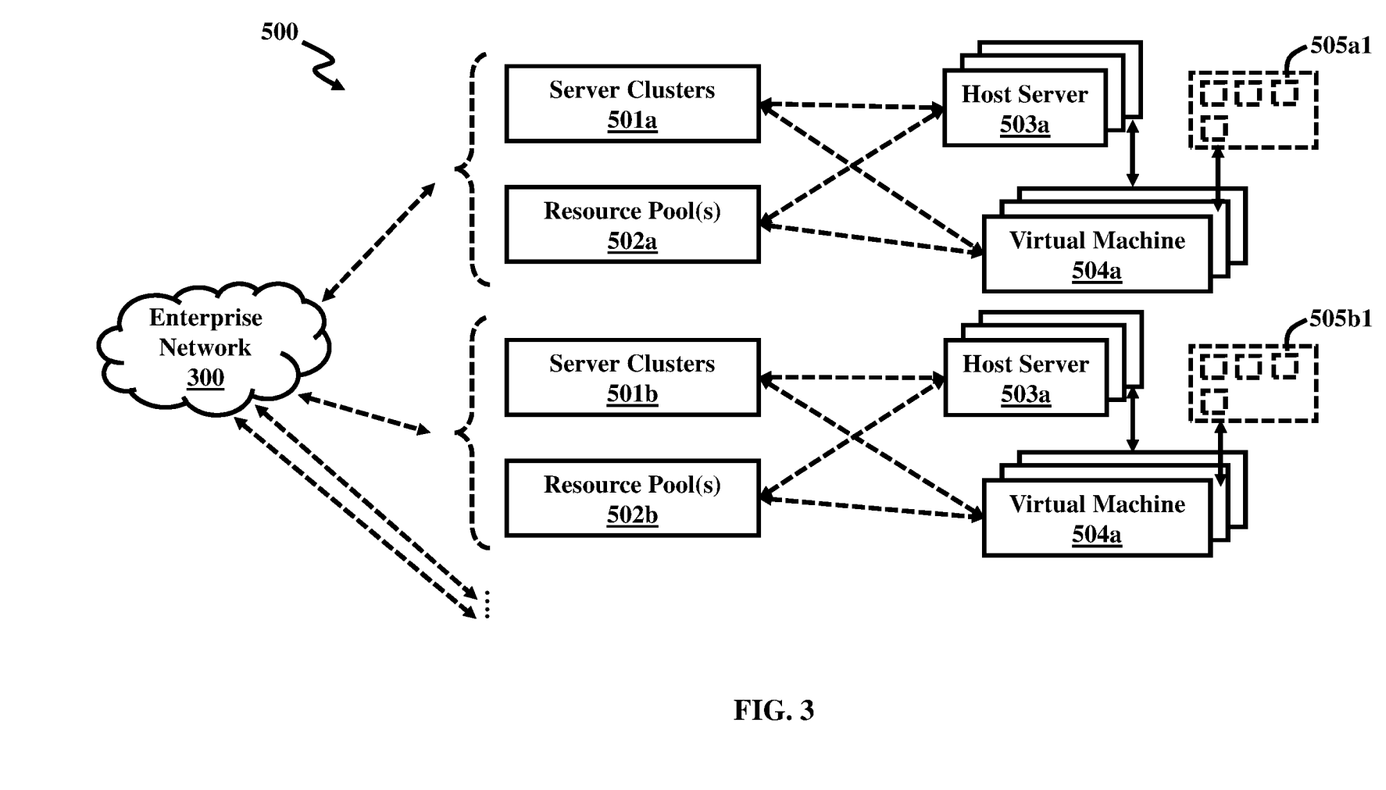
FIG. 3 illustrates an exemplary block diagram of different components of data center servers and virtual environments, according to an embodiment herein.

FIG. 3 is an illustration of a data center virtual environment 500 being monitored and controlled by a system 100, according to certain embodiments herein. Certain data center virtual environments may comprise a list of server clusters 501, resource pool 502, etc. Server cluster 501 may further comprise hosts 503 or virtual machines 504. Each virtual machine 504 may comprise multiple applications/processes 505.

The enterprise network 300 provides a wired and/or wireless communication medium between the IPM+agent 200 and IPM+IOT engine 400. In certain embodiments of the system 400, jobs scheduler 401 pulls all the data from the local datastore 202 to the data center database 402 through the network medium 300. As shown, the IPM+IOT engine 400 comprises multiple dashboard views 403. In general, dashboard views 403 provide comprehensive views of performance for one or more host servers 403a, applications 403b, and virtual machines 403c being monitored, with specialized views for each level of virtual infrastructure. For instance, the on-screen graphics can comprise text and/or graphical depictions having attributes that convey information to the user and may include, but are not limited to: graphs, messages, maps, icons, shapes, colors, labels, values, tables, meters, charts. Dashboards views 403 may comprise single purpose screens that provide a user with a quick summary of a select component or group of components. For instance, certain dashboards views 403 can provide numerical and/or graphical representations of utilization metrics associated with the single object (e.g., datacenter, cluster, host server, resource pool, virtual machine, datastore or the like) or collection of objects. The dashboard views 403 can be further associated with additional views that provide statistical information for one or more objects being viewed in the dashboard.

For example, in some embodiments, embedded views can comprise one or more of the following:

Top 5 Application: shows the top five applications of virtual machines for the selected virtual machine or host.

Top 5 VM: shows the top five virtual machines in terms of utilization index for the selected host or cluster.

Top 5 Disks View: shows the top five virtual machines in terms of disk activity for the selected Top 5 NIC View: shows the top five virtual machines in terms of NIC activity for the selected host.

Top 5 Ready View: shows the top five virtual machines in terms of percent readiness for CPU cycles for the selected host or virtual machines.

VM Energy Consumption: shows the energy consumption of virtual machines.

APP Energy Consumption: shows the energy consumption of applications/processes running inside virtual machines.

Status View: provides a summary of the present status of the parent object for a selected virtual machine.

The dashboard views 403 display an advisor report 403d. The dashboard views 403 further includes an alarms tool 403e that provides a display for viewing alarms associated with the virtual infrastructure. In some embodiments, the alarms are grouped by object and severity level. The alarms tool 403e can be used to monitor alarms and to identify the sources of problems within the monitored virtual infrastructures.

Dashboard views may comprise the diagnostics tool 403f that provides an architectural representation of the monitored virtual environments. In some embodiments, this representation advantageously allows a user to view how components of the monitored virtual environments interrelate and how the performance of one component impacts the performance of another. In addition, it also represents the possible impact of migration of virtual machines into another host servers or the impact of load balancing due to power capping action within servers or virtual machines. The diagnostic tool 403f also represents the impact of running one application or software from one virtual machine to another or from one host server to another host server. A prediction tool 403g can also be displayed in the dashboard views 403, which receives input from prediction modules 405.

The system 400 includes an analytics engine 404. The analytics engine 404 is responsible for multiple tasks. It calculates the impact of running one application or virtual machines in different host server platform. It reads the performance data of applications or virtual machines from data center database 402. Then, it calculates its required resource utilization from these resource consumption histories. The analytics engine 404 is responsible for detecting underutilized or current servers and advises to release those servers by migrating all their virtual machines to other host server that can fulfill the resource demands and where energy consumption is less than the current platform.

In analytics engine 404, a new metric has been introduced, called Footprint Index (FI) to compute the overall CPU and memory utilization based on the respective architecture. The following formula is used to calculate the Footprint Index of Host Server and virtual machine and application running inside it:

$$\text{FI}_{Host}=(\text{CPU \% of Host}*0.5+\text{mem \% of Host}*0.5) \qquad (8)$$

$$\text{FI}_{VM}=(\text{CPU \% of VM}*0.5+\text{mem \% of VM}*0.5) \qquad (9)$$

$$\text{FI}_{app}=(\text{CPU \% of App}*0.5+\text{mem \% of App}*0.5) \qquad (10)$$

Footprint Index helps data center administrator to understand the overall resource utilization (CPU, memory) and available resources on different servers.

Figure 5:
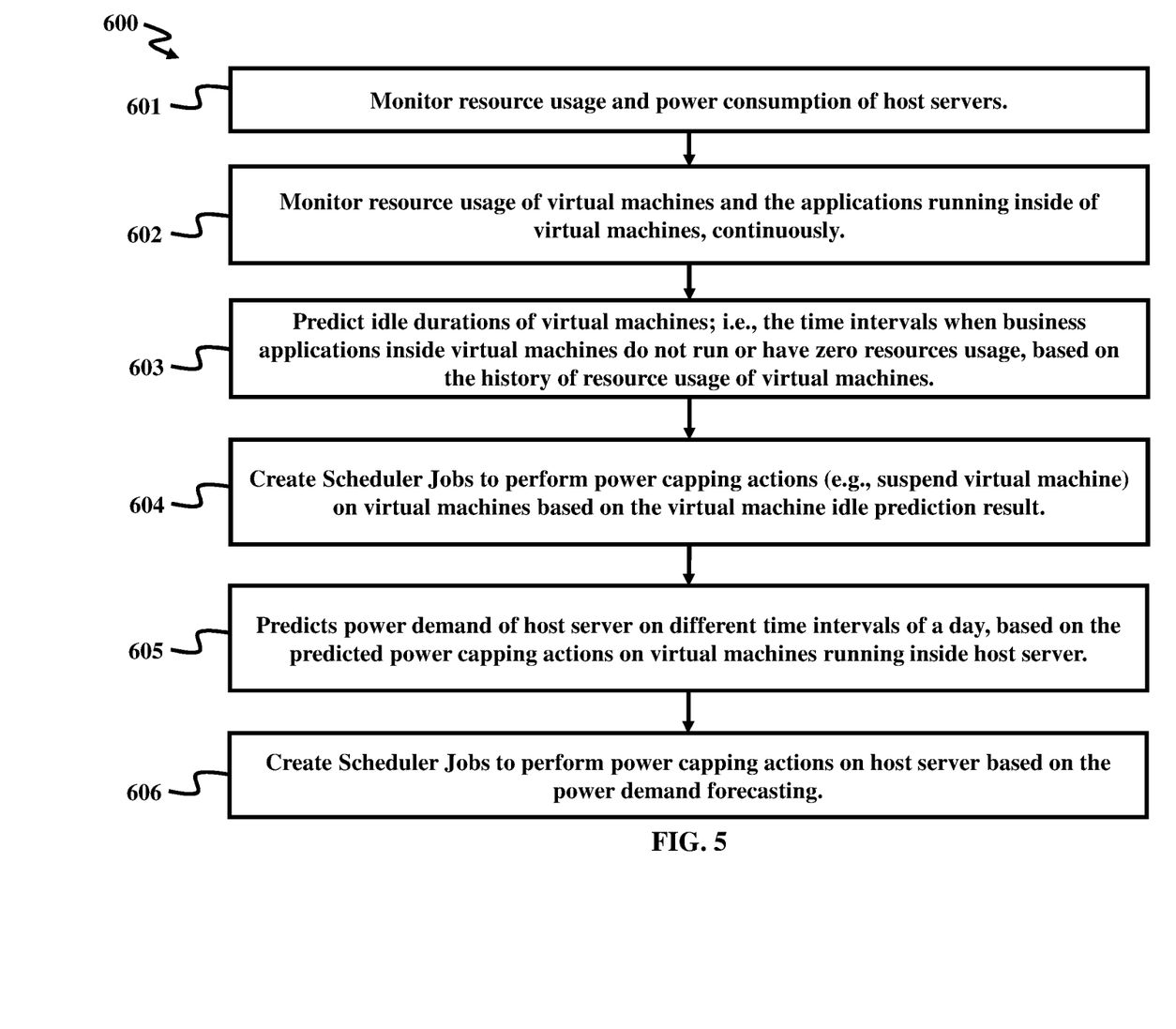
FIG. 5 illustrates a flowchart of an exemplary process for reducing server power consumption, according to an embodiment herein.

FIG. 5 illustrates a flowchart of power reduction in a server. As shown in steps 601, 602 client agent 200 receives performance data, power consumption data of host servers, virtual machines and the applications running inside virtual machines and sends this to IPM+IOT engine 400. The data is stored in data center database 402. The analytics engine 404 performs analysis over this time series data and passes it to the prediction module 405. At step 603, the prediction module 405 uses neural network models and applies an idle prediction technique (such as described in U.S. patent application Ser. No. 15/978,176) that detects the idle virtual machines and active virtual machines based on resource utilization and applications running status. In certain scenarios, prediction module 405 forecasts the running status of applications/processes and if found that they are not required to run then the virtual machines can be suspended and overall power consumption will be reduced.

Engine 400 comprise a recommended action list 406 generated by analytic engine 404 and prediction module 405. The recommended action list 406 is generated at step 604 based on the result of prediction module 405 on the virtual machine's idle duration to take appropriate power capping actions on virtual machines. Example actions are, for example, switch on/off or suspend virtual machine which are idle, migrate virtual machine from those servers where few virtual machines are active to another server.

In step 605, the prediction module 405 also predicts the times when the host servers are underutilized or idle in terms of less resource utilization. The prediction model 405 also predicts the energy requirement at three different levels. It predicts energy consumption of the host servers, for virtual machines and their applications. A clear energy requirement provides a great reliability to the data center infrastructure. The dashboard views 403 can further provide a prediction or forecast view in step 606 about the host server's expected utilization or power consumption. The prediction module uses a combination of CNN and Deep Bidirectional LSTM network [5] for all forecasting processes like footprint index, energy requirements etc. The forecasted results create the scope to perform the power saving actions on the host servers as well as virtual machines to reduce overall power consumption of the data center.

Figure 6:
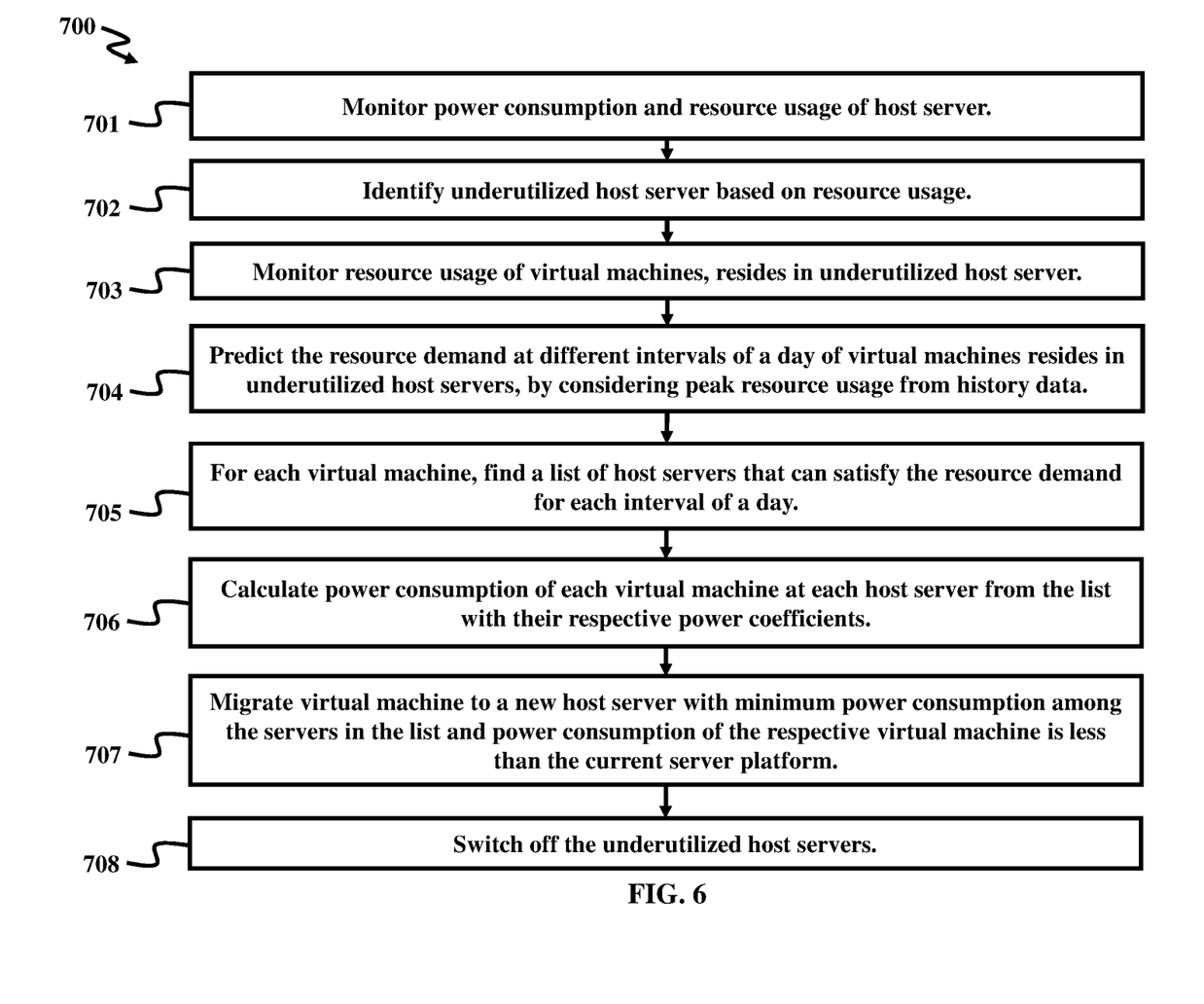
FIG. 6 illustrates a flowchart of optimizing overall power consumption by migrating virtual machines, according to an embodiment herein.

The flowchart of the entire process to find optimal platform for virtual machine and releasing the underutilized host is described in FIG. 6. In step 701, an agent is monitoring power consumption and resource usage of each server. Then analytics engine 400, identifies the underutilized servers. The underutilized servers are those where resource usage based on the server's capacity is less than the predefined threshold as indicated in step 702. In steps 703 and 704, the analytics engine 404 considers the peak resource usage as the predicted resource demand of each virtual machine for different intervals of the day, based on the historical performance data. Since the CPU capacity is already calculated in GFLOPS and memory capacity in GB for all host servers, the predicted CPU usage and memory usage demand are also converted to GFLOPS and GB. Therefore, from the resource usage data it can be calculated that how much resource of the host servers are utilized and how much resource is still available to be utilized. In step 705, the analytics engine 404, considers those servers for migrating the virtual machine where the available CPU and memory meets the resource demand of the respective virtual machines for all intervals of a day and forms a list called as "Destination Servers" as against the source underutilized server whose virtual machines needs to be migrated one by one. After that at step 706, it uses the power coefficients $k_1$, $k_2$, $k_3$, $k_4$ of the each of the destination servers to calculate the expected power consumption based on the resource demand of the virtual machines on the respective server using Equation (6). Therefore, at step 707, the server with minimum power consumption among all the servers in destination list of a virtual machine is selected, also the power consumption of that virtual machine in the selected server is less than the current server platform. Thus, at step 708, the underutilized server can be released which saves lot of energy consumption after migrating all its virtual machines. On the other hand, this ensures the virtual machines are shifted to its optimal destination servers (optimal platforms) that not only meet their resource demands, but also final power consumption will be less than the current platform.

In an example, the embodiments herein can provide a computer program product configured to include a pre-configured set of instructions, which when performed, can result in actions as stated in conjunction with various figures herein. In an example, the pre-configured set of instructions can be stored on a tangible non-transitory computer readable medium. In an example, the tangible non-transitory computer readable medium can be configured to include the set of instructions, which when performed by a device, can cause the device to perform acts similar to the ones described here.

The embodiments herein may also include tangible and/or non-transitory computer-readable storage media for carrying or having computer executable instructions or data structures stored thereon. Such non-transitory computer readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a special purpose computer or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network. If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 7:
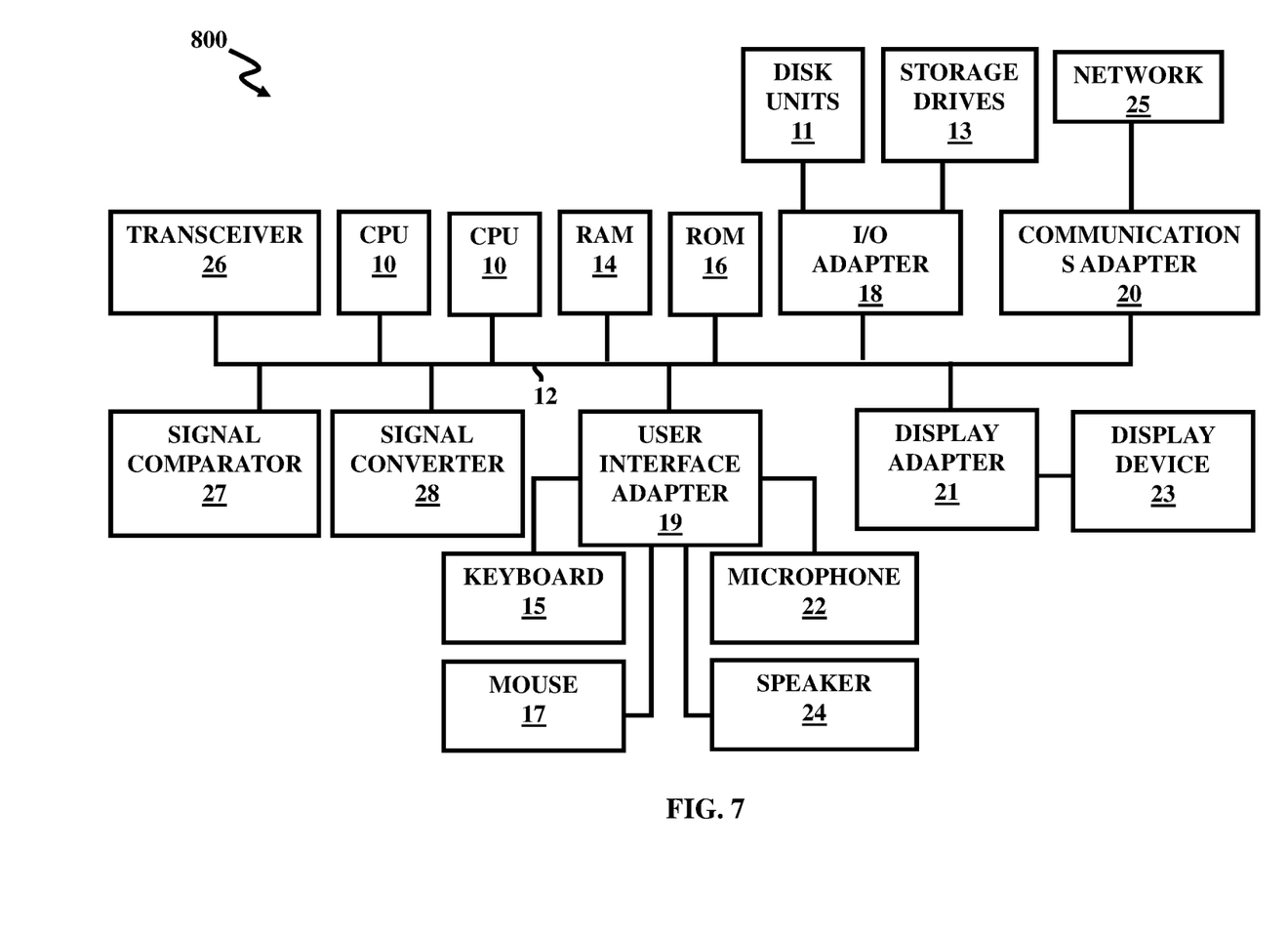
FIG. 7 illustrates a block diagram of a computer system used in accordance with an embodiment herein.

A representative hardware environment for practicing the embodiments herein is depicted in FIG. 7, with reference to FIGS. 1 through 6. This schematic drawing illustrates a hardware configuration of an information handling/computer system 800 in accordance with the embodiments herein. The system 800 comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system 700 can read the inventive instructions on the program storage devices and follow these instructions to execute the methodology of the embodiments herein. The system 700 further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network, and a display adapter 21 connects the bus 12 to a display device 23 which may be embodied as an output device such as a monitor, printer, or transmitter, for example. Further, a transceiver 26, a signal comparator 27, and a signal converter 28 may be connected with the bus 12 for processing, transmission, receipt, comparison, and conversion of electric or electronic signals.

In some examples, the processor (e.g., CPU 10) and various other processing devices described herein and/or illustrated in the figures may be embodied as hardware-enabled modules and may be configured as a plurality of overlapping or independent electronic circuits, devices, and discrete elements packaged onto a circuit board to provide data and signal processing functionality within a computer and/or electronic device. An example might be a comparator, inverter, or flip-flop, which could include a plurality of transistors and other supporting devices and circuit elements. The modules that are configured with electronic circuits process computer logic instructions capable of providing digital and/or analog signals for performing various functions as described herein. The various functions can further be embodied and physically saved as any of data structures, data paths, data objects, data object models, object files, database components. For example, the data objects could be configured as a digital packet of structured data. The data structures could be configured as any of an array, tuple, map, union, variant, set, graph, tree, node, and an object, which may be stored and retrieved by computer memory and may be managed by processors, compilers, and other computer hardware components. The data paths can be configured as part of the computer CPU 10 that performs operations and calculations as instructed by the computer logic instructions. The data paths could include digital electronic circuits, multipliers, registers, and buses capable of performing data processing operations and arithmetic operations (e.g., Add, Subtract, etc.), bitwise logical operations (AND, OR, XOR, etc.), bit shift operations (e.g., arithmetic, logical, rotate, etc.), complex operations (e.g., using single clock calculations, sequential calculations, iterative calculations, etc.). The data objects may be configured as physical locations in computer memory and can be a variable, a data structure, or a function. In the embodiments configured as relational databases (e.g., such Oracle® relational databases), the data objects can be configured as a table or column. Other configurations include specialized objects, distributed objects, object-oriented programming objects, and semantic web objects, for example. The data object models can be configured as an application programming interface for creating HyperText Markup Language (HTML) and Extensible Markup Language (XML) electronic documents. The models can be further configured as any of a tree, graph, container, list, map, queue, set, stack, and variations thereof. The data object files are created by compilers and assemblers and contain generated binary code and data for a source file. The database components can include any of tables, indexes, views, stored procedures, and triggers.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Those skilled in the art will recognize that the embodiments herein can be practiced with modification within the spirit and scope of the appended claims.

REFERENCES

[1] Gelenbe, E., et al., "The Impact of Information Technology on Energy Consumption and Carbon Emissions," Ubiquity, an ACM publication, Association for Computing Machinery, June 2015, Article No. 1, pp. 1-15.
[2] Manotas, I., et al., "An Empirical Study of Practitioners' Perspectives on Green Software Engineering," 2016 IEEE/ACM Proceedings of the 38th IEEE International Conference on Software Engineering, May 14-22, 2016, Austin, Tex., pp. 237-248.
[3] Khoshkholghi, M., et al., "Energy-Efficient Algorithms for Dynamic Virtual Machine Consolidation in Cloud Data Centers," IEEE Access, Vol. 5, Jun. 1, 2017, pp. 10709-10722.
[4] Dolbeau, R., "Theoretical Peak FLOPS per instruction set on modern Intel CPUs," Working Paper, Research Gate, January 2015, pp. 1-10.
[5] Ullah, A., et al., "Action Recognition in Video Sequences using Deep Bi-Directional LSTM With CNN Features," IEEE Access, Vol. 6, Nov. 28, 2017, pp. 1155-1166.

What is claimed is:

1. A system for monitoring a power consumption of a host server and deriving virtual machine level and application level power consumption, wherein the system comprises:
a processor that models power consumption levels for virtual machines as well as for applications/processes running inside them to provide clarity of power distribution among virtual machines and to identify the applications/processes that consumes more or less power, and to identify where power should be distributed among different host servers; and
a client-side agent to monitor and perform specific actions on host servers and virtual machines residing thereon, wherein the client-side agent comprises:
computer hardware including at least one computer processor and a computer display; and
a plurality of modules stored in computer-readable storage and comprising computer-readable instructions that, when executed by the computer processor, cause the computer hardware to perform operations defined by the computer-executable instructions, wherein the client-side agent comprises:
a data collector module, an action controller module, a power module, a health check module, and a local datastore, wherein the data collector module collects power information data of host and it also collects resource utilization data, health status data, system information, hardware information data of host server and virtual machines and the applications/processes running inside each of its VMs, wherein the local datastore contains all data collected by a data collector module from host servers and virtual machines, wherein the power module computes power consumption of virtual machines and its applications/processes, wherein the health check module verifies the health status data of host servers with predefined constraints and if found any inconsistency then recommends specific actions for that inconsistency to the action controller, and wherein the action controller module executes actions within the host servers or virtual machines, based on the recommended action provided by the health check module or from an intelligent power management and internet of things (IPM+IOT) engine.

2. The system of claim 1, further comprising:
a user interface module configured to receive impact data and to provide multiple views of host server information and virtual machines information and application/process level information, wherein the user interface module comprises a report module to generate diagnostics and the IPM+IOT engine; and
an alarm module configured to generate an alert when a projected impact on at least one resource of a target physical platform exceeds a predetermined threshold.

3. The system of claim 1, wherein the IPM+IOT engine is configured to recommend power capping actions and generating diagnostics reports and optimizing data center resource utilization.

4. The system of claim 3, further comprising:
a database containing performance, health, and power information data of data center host servers as well as virtual machines and their applications/processes residing thereon; and
a job scheduler module that performs scheduling tasks comprising pulling data from an intelligent power management (IPM)+local datastore.

5. The system of claim 1, wherein the processor is configured to process a footprint index to measure a heterogenous resource utilization and other metrics that have been defined that reflect a performance capacity of a host server, and wherein based on these two metrics a suggestive optimal platform list is generated to show the impact of optimal resource utilization and power consumption.

6. The system of claim 1, wherein the processor is configured to derive power metrics to measure power efficiency of heterogenous host servers, and wherein the power metrics are used to estimate application level energy footprints.

7. The system of claim 1, wherein the processor is configured to process analytics that determine optimal resource platforms for business applications based on energy footprints to ensures minimum power requirements to run virtual machines and their applications.

8. The system of claim 1, further comprising a prediction module that predicts a utilization of host servers, virtual machines, and applications running inside the virtual machines, wherein the prediction module forecasts and turns off the host server when the utilization is under a minimum threshold limit, and wherein the prediction module analyzes the utilization of virtual machines and the applications running inside them and forecasts a duration when the virtual machines are inactive and no applications are running such that the prediction module permits the processor to switch off virtual machines and corresponding host servers when they are inactive.

9. The system of claim 1, wherein the processor is configured to monitor power levels of data center host servers in order to run different data center host servers at different times.

10. A method for monitoring a power consumption of a host server and deriving virtual machine level and application level power consumption, wherein the method comprises:
modeling power consumption levels for virtual machines as well as for applications/processes running inside them;
providing clarity of power distribution among virtual machines and identifying the applications/processes that consumes more or less power;
identifying where power should be distributed among different host servers; and
using a client-side agent to monitor and perform specific actions on host servers and virtual machines residing thereon, wherein the client-side agent comprises:
a data collector module, an action controller module, a power module, a health check module, and a local datastore, wherein the data collector module collects power information data of host and it also collects resource utilization data, health status data, system information, hardware information data of host server and virtual machines and the applications/processes running inside each of its VMs, wherein the local datastore contains all data collected by a data collector module from host servers and virtual machines, wherein the power module computes power consumption of virtual machines and its applications/processes, wherein the health check module verifies the health status data of host servers with predefined constraints and if found any inconsistency then recommends specific actions for that inconsistency to the action controller, and wherein the action controller module executes actions within the host servers or virtual machines, based on the recommended action provided by the health check module or from an intelligent power management and internet of things (IPM+IOT) engine.

11. The method of claim 10, further comprising:
receiving impact data and to provide multiple views of host server information and virtual machines information and application/process level information;
generating diagnostics and the IPM+IOT engine; and
generating an alert when a projected impact on at least one resource of a target physical platform exceeds a predetermined threshold.

12. The method of claim 10, wherein the IPM+IOT engine is configured to recommend power capping actions and generating diagnostics reports and optimizing data center resource utilization.

13. The method of claim 12, further comprising:
providing a database containing performance, health, and power information data of data center host servers as well as virtual machines and their applications/processes residing thereon; and
using a job scheduler module to perform scheduling tasks comprising pulling data from an intelligent power management (IPM)+local datastore.

14. The method of claim 10, further comprising:
processing a footprint index to measure a heterogenous resource utilization and other metrics that have been defined that reflect a performance capacity of a host server; and
generating a suggestive optimal platform list based on these two metrics to show the impact of optimal resource utilization and power consumption.

15. The method of claim 10, further comprising deriving power metrics to measure power efficiency of heterogenous host servers, wherein the power metrics are used to estimate application level energy footprints.

16. The method of claim 10, further comprising processing analytics that determine optimal resource platforms for business applications based on energy footprints to ensures minimum power requirements to run virtual machines and their applications.

17. The method of claim 10, further comprising:
predicting a utilization of host servers, virtual machines, and applications running inside the virtual machines;
forecasting and turning off the host server when the utilization is under a minimum threshold limit; and
analyzing the utilization of virtual machines and the applications running inside them and forecasts a duration when the virtual machines are inactive and no applications are running such that the prediction module permits the processor to switch off virtual machines and corresponding host servers when they are inactive.

18. The method of claim 10, further comprising monitoring power levels of data center host servers in order to run different data center host servers at different times.

19. A non-transitory program storage device readable by a computer, and comprising a program of instructions executable by the computer to perform a method for monitoring a power consumption of a host server and deriving virtual machine level and application level power consumption, wherein the method comprises:
modeling power consumption levels for virtual machines as well as for applications/processes running inside them;
providing clarity of power distribution among virtual machines and identifying the applications/processes that consumes more or less power;
identifying where power should be distributed among different host servers; and
using a client-side agent to monitor and perform specific actions on host servers and virtual machines residing thereon, wherein the client-side agent comprises:
a data collector module, an action controller module, a power module, a health check module, and a local datastore, wherein the data collector module collects power information data of host and it also collects resource utilization data, health status data, system information, hardware information data of host server and virtual machines and the applications/processes running inside each of its VMs, wherein the local datastore contains all data collected by a data collector module from host servers and virtual machines, wherein the power module computes power consumption of virtual machines and its applications/processes, wherein the health check module verifies the health status data of host servers with predefined constraints and if found any inconsistency then recommends specific actions for that inconsistency to the action controller, and wherein the action controller module executes actions within the host servers or virtual machines, based on the recommended action provided by the health check module or from an intelligent power management and internet of things (IPM+IOT) engine.

20. The non-transitory program storage device of claim 19, wherein the method comprises:
receiving impact data and to provide multiple views of host server information and virtual machines information and application/process level information;
generating diagnostics and the IPM+IOT engine; and
generating an alert when a projected impact on at least one resource of a target physical platform exceeds a predetermined threshold.

* * * * *